(No Model.) 2 Sheets—Sheet 1.
L. SMITH.
HARROW.
No. 408,816. Patented Aug. 13, 1889.
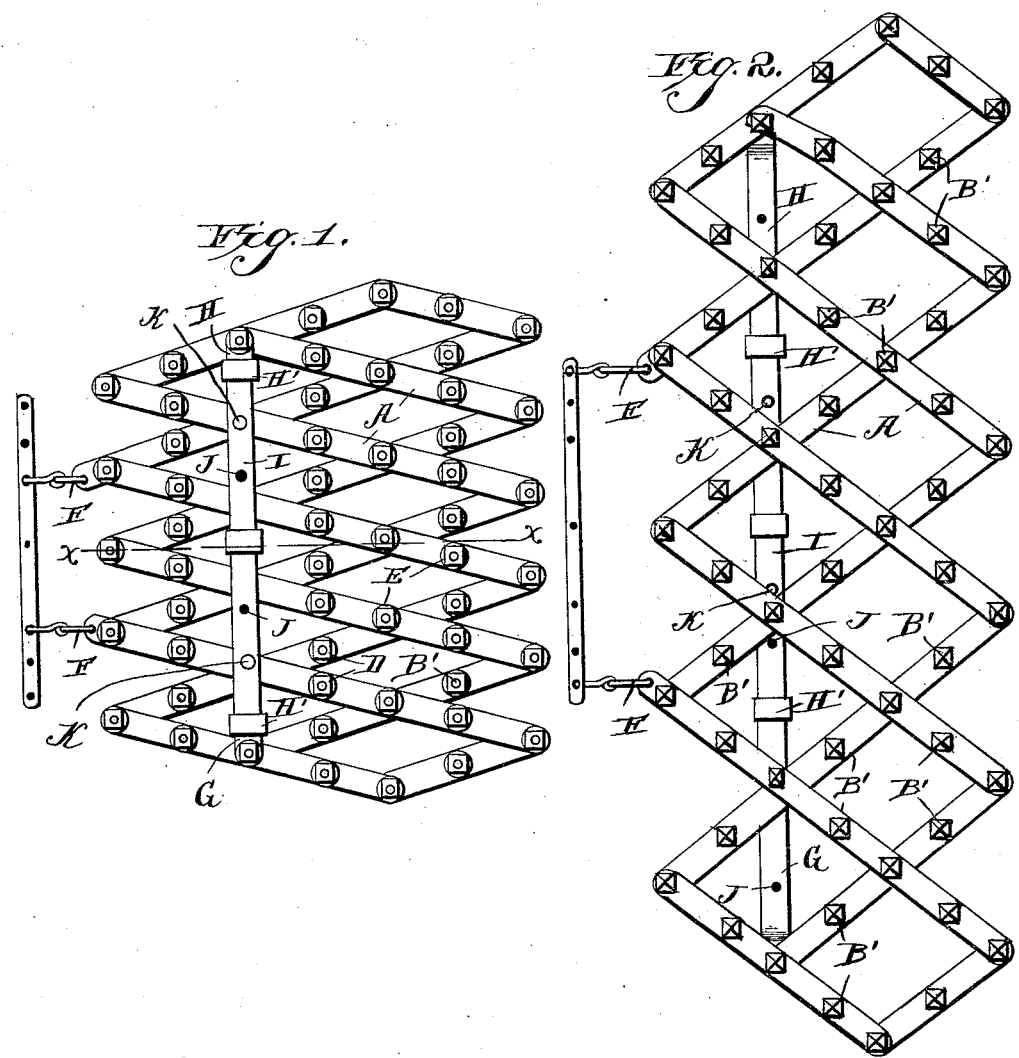
Witnesses
Henry J. Dieterich
Wm. Bagger
Inventor
Lewis Smith,
By his Attorneys (No Model.) 2 Sheets—Sheet 2.
L. SMITH.
HARROW.
No. 408,816. Patented Aug. 13, 1889.
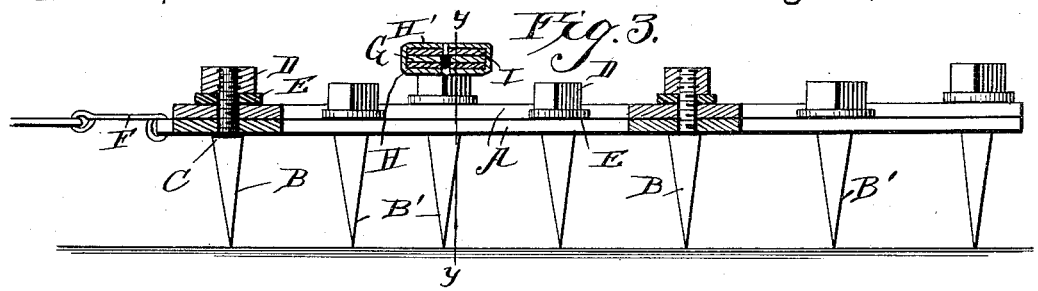
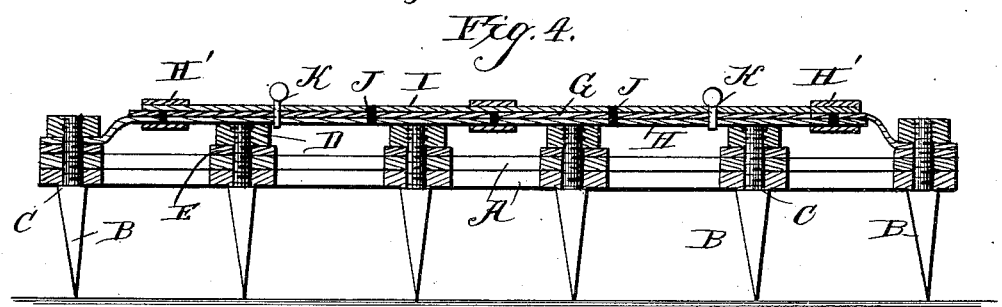
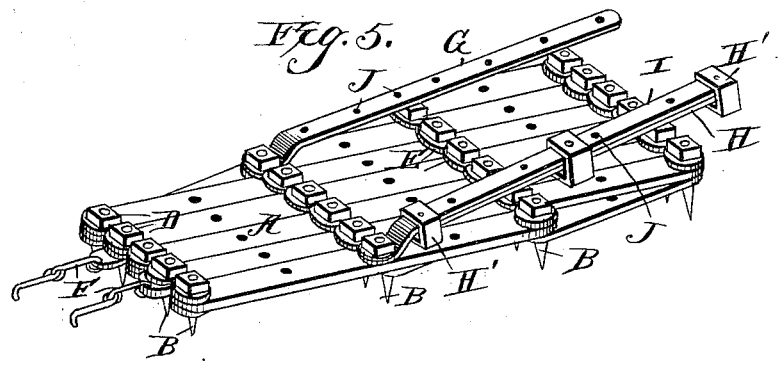
Witnesses
Henry G. Dieterich
Wm. Bagger
Inventor
Lewis Smith
By his Attorneys

UNITED STATES PATENT OFFICE.

LEWIS SMITH, OF GREEN TOP, MISSOURI.

HARROW.

SPECIFICATION forming part of Letters Patent No. 408,816, dated August 13, 1889.

Application filed February 16, 1889. Serial No. 300,117. (No model.)

*To all whom it may concern:*

Be it known that I, LEWIS SMITH, a citizen of the United States, residing at Green Top, in the county of Schuyler and State of Missouri, have invented new and useful Improvements in Harrows, of which the following is a specification.

This invention relates to harrows; and it has for its object to provide a harrow-frame which may be conveniently extended or folded, so as to cover a greater or smaller area in progressing over the field and bring the harrow-teeth more or less closely together; also, to provide a brace for the said harrow-frame which shall retain it securely in any position to which it may be extended, and stiffen it sufficiently without materially detracting from the flexibility of the harrow-frame in passing over rough ground.

The invention consists in the improved construction of the device, which will be hereinafter fully described, and particularly pointed out in the claim.

In the drawings, Figure 1 is a top view showing the harrow partly extended for operation. Fig. 2 is a bottom view showing the harrow-frame extended to its full capacity. Fig. 3 is a vertical transverse sectional view taken on the line $x\,x$ of Fig. 1. Fig. 4 is a vertical sectional view taken on line $y\,y$ in Fig. 3. Fig. 5 is a perspective view showing the harrow folded for transportation.

The same letters refer to the same parts in all the figures.

The frame of my improved harrow is composed of a series of lazy-tongs or bars A A, which are connected pivotally by means of the harrow-teeth B B, which are provided with shoulders or offsets C C, above which they are screw-threaded to receive the nuts and washers D E, by means of which they are attached to bars of the harrow-frame, which are in this manner connected. The upper bars of the harrow-frame are all parallel to each other, and arranged at an angle to the lower bars, which latter are likewise parallel to each other. By the application of this well-known principle or method of connecting the bars it will be seen that the harrow-frame is made capable of being extended or folded, as shown in the several figures of the drawings.

F F are links or draft-bars, one of which is attached to one of the upper and the other to one of the lower bars of the harrow-frame, at the front end of the same, for the attachment of the draft, which may be made in the usual manner by means of whiffletrees.

G and H are a pair of braces connected pivotally to two of the upper frame-bars of the harrow at the outer ends of the frame. These braces extend inwardly, one above the other, and both are inserted by loops H' H' upon a third brace-bar I, which is arranged above the bars G H, as clearly shown in Fig. 3 of the drawings. The bars G, H, and I are provided with vertical perforations J J, which may be brought into alignment with each other for the passage of pins K K, which thus serve to retain the harrow-frame in any position to which it may be adjusted. It will be seen that the brace composed of the bars G H I, while it prevents the expansion or contraction of the harrow-frame will not interfere with the flexibility thereof, thus permitting the said harrow-frame to ride easily over any inequalities in the ground.

It will be seen that by the use of the supplementary brace-bar the main braces will be rigidly connected and prevented from yielding laterally, as they would otherwise be liable to do.

In addition to the teeth B B, by which the frame-bars of the harrow are connected, any desired number of additional teeth B' may be used, such additional teeth being secured to the frame-bars in any suitable manner.

The advantages of my improved harrow will be readily understood from the foregoing description, taken in connection with the drawings.

The construction is exceedingly simple, and is therefore both inexpensive and durable. The frame, in fact, may be easily put together by any unskilled person. The frame may, when desired, be extended so as to cover a considerable area; or it may be contracted, so as to bring the teeth as closely together as may be desired. For transportation or storage, the frame may be folded, as shown in Fig. 5 of the drawings, thus occupying but very little room.

I am aware that folding harrow-frames have heretofore been constructed on the lazy-tongs principle; also, that such harrow-frames have been provided with braces or stiffeners. This, therefore, I do not broadly claim.

Having thus described my invention, I claim—

The combination, with the harrow-frame consisting of bars connecting pivotally by means of the harrow-teeth, of the brace-bars pivoted at the outer ends of the harrow-frame and extending inwardly one above the other, and the supplementary brace-bar having loops encircling the pivoted brace-bars, all of the said brace-bars being provided with perforations, which may be brought into alignment to receive the securing pins or bolts, substantially as set forth.

In testimony that I claim the foregoing as my own I have hereto affixed my signature in presence of two witnesses.

LEWIS SMITH.

Witnesses:
ELISHA BOWEN,
LUCIUS SANDERSON.